US012154734B2

(12) United States Patent
Holp et al.

(10) Patent No.: US 12,154,734 B2
(45) Date of Patent: Nov. 26, 2024

(54) FULLY INTEGRATED MANUAL OPEN MECHANISM FOR MVDC HYBRID CIRCUIT BREAKER

(71) Applicant: EATON INTELLIGENT POWER LIMITED, Dublin (IE)

(72) Inventors: Tyler Holp, Coraopolis, PA (US); Brad R. Leccia, Bethel Park, PA (US); Douglas Michael Brandt, Wampum, PA (US); Logan Weigle, McKees Rocks, PA (US); Xin Zhou, Wexford, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 190 days.

(21) Appl. No.: 17/691,472

(22) Filed: Mar. 10, 2022

(65) Prior Publication Data

US 2023/0290588 A1 Sep. 14, 2023

(51) Int. Cl.
*H01H 21/22* (2006.01)
*H01H 50/18* (2006.01)

(52) U.S. Cl.
CPC ............ *H01H 21/22* (2013.01); *H01H 50/18* (2013.01)

(58) Field of Classification Search
CPC ........ H01H 21/22; H01H 21/36; H01H 50/18; H01H 3/46; H01H 31/022; H01H 31/42; H01H 31/666; H01H 31/6661; H01H 2033/6661; H01H 2033/6667; H01H 2033/426; H01H 9/541; H01H 9/542; H01H 9/547; H01H 9/548; H01H 2009/543; H01H 2009/544; H01H 2009/546; H02H 3/033; H02H 3/083; H02H 3/165; H02J 3/00125; G01R 19/175
USPC ........... 218/118, 3, 6–8, 10; 200/50.19, 50.4
See application file for complete search history.

(56) References Cited

U.S. PATENT DOCUMENTS

| | | | | |
|---|---|---|---|---|
| 3,597,713 | A * | 8/1971 | McClain | H01H 73/38 361/115 |
| 5,912,604 | A * | 6/1999 | Harvey | H01H 33/6662 218/138 |
| 6,930,271 | B1 * | 8/2005 | Palmieri | H01H 33/6662 218/120 |
| 7,576,957 | B2 * | 8/2009 | Zhou | H01H 9/563 361/2 |
| 9,431,184 | B2 * | 8/2016 | Lee | H01H 3/222 |
| 10,312,679 | B2 * | 6/2019 | Okerman | H02H 1/0015 |
| 10,424,444 | B2 * | 9/2019 | Yang | G01R 31/3272 |
| 10,614,987 | B2 | 4/2020 | Holp et al. | |
| 10,978,256 | B1 * | 4/2021 | Schafer | H01H 9/00 |
| 11,004,619 | B2 * | 5/2021 | Ashtekar | H01H 33/666 |

(Continued)

*Primary Examiner* — William A Bolton
(74) *Attorney, Agent, or Firm* — Eckert Seamans Cherin & Mellott, LLC

(57) ABSTRACT

A manual opening mechanism for use with an isolation switch of a circuit interrupter is fully integrated into the circuit interrupter. The manual opening mechanism includes a rotating handle that is accessible from the front panel of the circuit interrupter. Rotating the handle applies force to the centerline of the isolation switch drive shaft, which prevents uneven loading and thus optimizes robustness during manual opening of the isolation switch. In addition, the handle has an ergonomic design, and is proportioned to minimize the force that an operator must apply to the handle in order to open the isolation switch.

17 Claims, 6 Drawing Sheets

(56) References Cited

U.S. PATENT DOCUMENTS

| | | | | |
|---|---|---|---|---|
| 2015/0116878 | A1* | 4/2015 | Richard | H02H 3/20 335/196 |
| 2020/0328054 | A1* | 10/2020 | Hanna | H01H 50/14 |
| 2020/0403396 | A1* | 12/2020 | Chen | H02H 1/0007 |

* cited by examiner

FULLY INTEGRATED MANUAL OPEN MECHANISM FOR MVDC HYBRID CIRCUIT BREAKER

FIELD OF THE INVENTION

The disclosed concept relates generally to circuit interrupters, and in particular, to mechanisms for manually opening isolation switches of circuit interrupters in the event of power loss.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include mechanically operated separable electrical contacts, which operate as a switch. When the separable contacts are in contact with one another in a closed state, current is able to flow through any circuits connected to the circuit interrupter. When the separable contacts are not in contact with one another in an open state, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Hybrid circuit interrupters employ an electronic interrupter in addition to the mechanical separable contacts, which are often components of a vacuum switch. The electronic interrupter comprises electronics structured to commutate current after a fault is detected. Once current is commutated from the mechanical vacuum switch to the electronic interrupter, the mechanical separable contacts are able to separate with a reduced risk of arcing. Hybrid circuit interrupters are equipped with control logic that causes the electronic interrupter turns off quickly after current is commutated, in order to fully open the circuit. Hybrid circuit interrupters often also include an isolation switch disposed downstream of the electronic interrupter and the mechanical separable contacts. Opening the isolation switch safeguards against current flowing downstream when any type of bus work or other downstream work needs to be performed on the system.

Control logic that serves to operate both the electronic interrupter and the isolation switch is usually powered by control power, and any type of control power fault that results in a loss of power to the control logic will eliminate the ability of the electronic interrupter and isolation switch to function properly, thus preventing the circuit interrupter from being able to interrupt a fault. A malfunction of the isolation switch caused by the control logic being unable to actuate opening of the isolation switch prevents the circuit interrupter from being able to completely open the circuit, making it unsafe to perform any type of downstream maintenance on the system. There is thus a need for a manual opening mechanism that can be used to operate the isolation switch in the event that control power is lost. However, the utility of such a manual opening mechanism depends on the manual opening mechanism being highly accessible, being easy to operate, and having the ability to prevent inadvertent interference with the operation of the circuit interrupter under normal operating conditions.

There is thus room for improvement within manual opening mechanisms for isolation switches of circuit interrupters.

SUMMARY OF THE INVENTION

These needs, and others, are met by a manual opening mechanism that is fully integrated into a circuit interrupter for use with an isolation switch of the circuit interrupter. The manual opening mechanism includes a rotating handle that is accessible from the front panel of the circuit interrupter. Rotating the handle applies force to the centerline of the isolation switch drive shaft, which prevents uneven loading and thus optimizes robustness during manual opening of the isolation switch. In addition, the handle has an ergonomic design, and is proportioned to minimize the force that an operator must apply to the handle in order to open the isolation switch.

In accordance with one aspect of the disclosed concept, an isolation switch for use with a hybrid circuit interrupter comprises: a fixed separable contact; a moving assembly, the moving assembly comprising a moving stem with a moving separable contact, and a drive rod assembly coupled to the moving stem, the drive rod assembly comprising a drive shaft; and a manual opening assembly. The manual opening assembly comprises: a drive shaft coupling coupled to a distal end of the drive shaft, the drive shaft coupling comprising a first end and a second end disposed opposite the first end, the first end facing toward the moving separable contact; and a manual opening mechanism. The manual opening mechanism comprises: a body comprising two arms coupled to one another, and a handle operatively coupled to the body. The moving assembly is structured to move the moving separable contacts between a closed state and an open state, the body of the manual opening mechanism is interposed between the first end and the second end of the drive shaft coupling, and the manual opening mechanism is structured to actuate the moving assembly to move from the closed state to the open state when the handle is rotated.

In accordance with another aspect of the disclosed concept, a hybrid circuit interrupter comprises: a line conductor structured to connect a load to a power source; a hybrid switch assembly disposed between the power source and the load, the hybrid switch assembly comprising mechanical separable contacts structured to move between a closed state and an open state, and an electronic interrupter comprising a number of electronic components, the electronic interrupter being structured to commutate current when a fault is detected on the line conductor; an operating mechanism structured to open and close the separable contacts; an electronic trip unit structured to monitor the line conductor for fault conditions and actuate the operating mechanism; and a vacuum isolation switch disposed between the hybrid switch assembly and the load. The vacuum isolation switch comprises: an isolation fixed separable contact; a moving assembly comprising a moving stem with an isolation moving separable contact, and a drive rod assembly coupled to the moving stem, the drive rod assembly comprising a drive shaft; and a manual opening assembly. The manual opening assembly comprises: a drive shaft coupling coupled to a distal end of the drive shaft, the drive shaft coupling comprising a first end and a second end disposed opposite the first end, the first end facing toward the isolation moving separable contact; and a manual opening mechanism. The manual opening mechanism comprises: a body comprising two arms coupled to one another, and a handle operatively coupled to the body. The isolation switch moving assembly is structured to move the isolation moving separable contact between a closed state and an open state, the body of the manual opening mechanism is interposed between the first end and the second end of the drive shaft coupling, the manual opening mechanism is structured to actuate the isolation switch moving assembly to move from the closed state to the open state when the handle is rotated, and the isolation switch is disposed along the line conductor such that opening the isolation switch disconnects the load from the power source.

In accordance with another aspect of the disclosed concept, an isolation switch for use with a hybrid circuit interrupter comprises: a fixed separable contact; a moving assembly comprising a moving stem with a moving separable contact, and a drive rod assembly coupled to the moving stem, the drive rod assembly comprising a drive shaft; a solenoid disposed in proximity to the drive shaft and in electrical communication with a control module, and a manual opening assembly. The manual opening assembly comprises: a drive shaft coupling coupled to a distal end of the drive shaft, the drive shaft coupling comprising a first end and a second end disposed opposite the first end, the first end facing toward the moving separable contact; and a manual opening mechanism. The manual opening mechanism comprises a body with two arms coupled to one another, and a handle operatively coupled to the body. The solenoid is configured to receive power from the control module and to actuate the moving assembly in order to open the vacuum isolation switch under a number of predetermined conditions, the manual opening assembly is structured to not interfere with movement of the isolation switch moving assembly when the drive shaft assembly is actuated to move by the solenoid, the moving assembly is structured to move the moving separable contacts between a closed state and an open state, and the manual opening mechanism is structured to actuate the moving assembly to move from the closed state to the open state when the handle is rotated.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
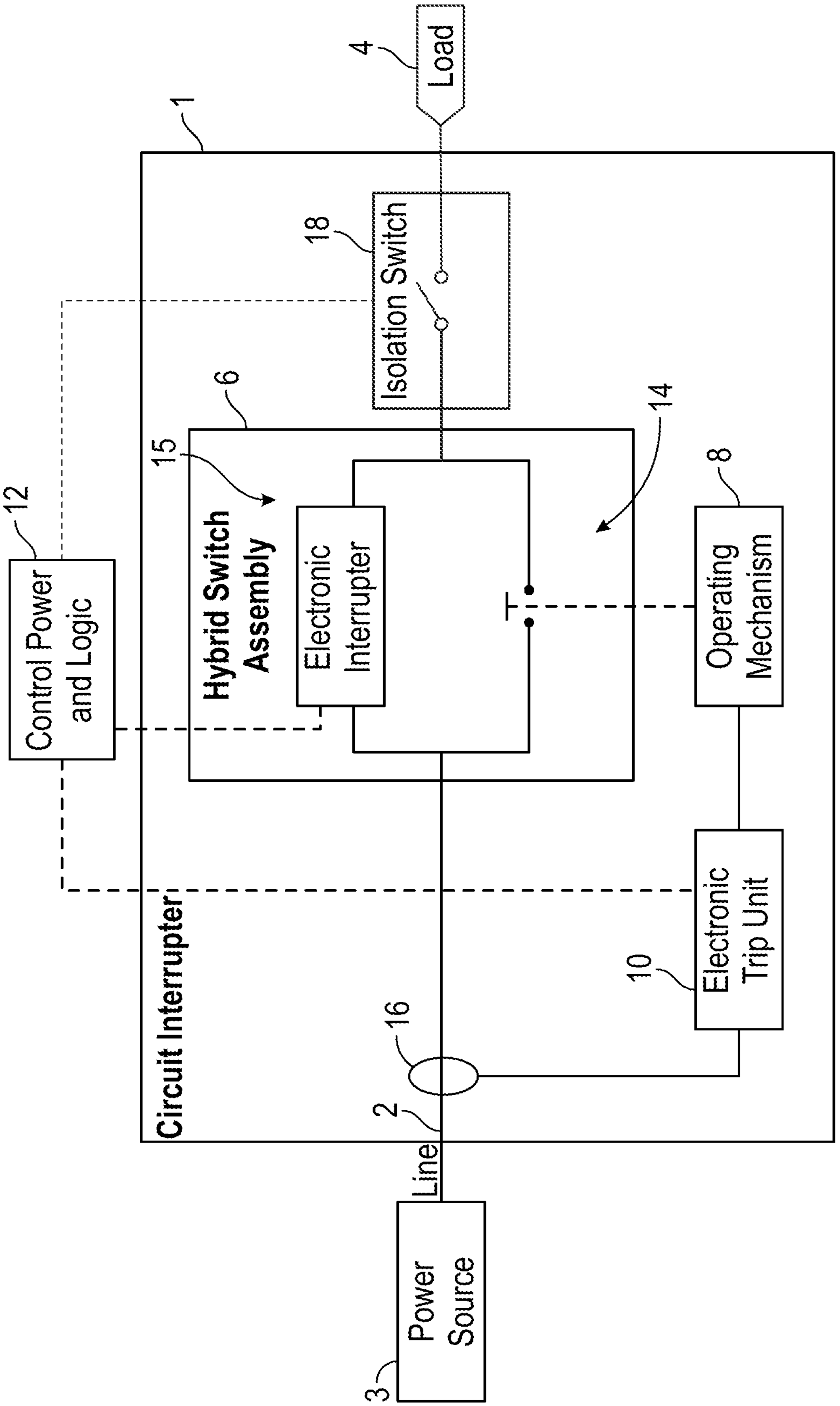
FIG. 1 is a schematic diagram of hybrid circuit interrupter with an isolation switch, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a hybrid circuit interrupter 1 (e.g., without limitation, a circuit breaker), in accordance with an example embodiment of the disclosed concept. The circuit interrupter 1 includes a line conductor 2 structured to electrically connect a power source 3 to a load 4. The circuit interrupter 1 is structured to trip open to interrupt current flowing between the power source 3 and load 4 in the event of a fault condition (e.g., without limitation, an overcurrent condition) in order to protect the load 4, circuitry associated with the load 4, as well as the power source 3.

The circuit interrupter 1 further includes a hybrid switch assembly 6, an operating mechanism 8, an electronic trip unit 10, and a control power and logic module 12 (referred to hereinafter as "control module 12" for brevity) in electrical communication with the trip unit 10. The hybrid switch assembly 6 comprises a set of mechanical separable contacts 14 and an electronic interrupter 15. In an exemplary embodiment of the disclosed concept, the mechanical contacts 14 are the fixed and moving contacts of a vacuum interrupter 15 (vacuum interrupter 15 being shown in FIG. 2). The electronic trip unit 10 is structured to monitor power flowing through the circuit interrupter 1 via a current sensor 16 and/or other sensors and to detect fault conditions based on the power flowing through the circuit interrupter 1. The operating mechanism 8 is structured to actuate opening of the mechanical contacts 14 in order to restrict current from reflowing through the mechanical contacts 14 to the load 4 when the electronic interrupter 15 interrupts the fault current. In response to detecting a fault condition, the electronic trip unit 10 is configured to notify control module 12 of the fault and to commutate fault current from the mechanical contacts 14 to the electronic interrupter 15 and output a signal to the operating mechanism 8 in order to actuate the operating mechanism 8 to open the mechanical contacts 14.

The hybrid switch assembly 6 in FIG. 1 is a simplified depiction of a hybrid switch intended to demonstrate how current commutates past mechanical contacts 14 in a hybrid switch, and is not intended to be limiting on the different types of hybrid switch assemblies that can be included in circuit interrupter 1. When the mechanical contacts 14 are in a closed state such that they are in contact with one another, current flows through the line conductor 2 and the mechanical contacts 14 to the load 4. The hybrid switch assembly 6 is configured such that, when the mechanical contacts 14 are closed, current does not flow through the electronic interrupter 15 and the electronic interrupter 15 is powered off.

The electronic interrupter 15 comprises a number of electronic components with switching functionality, such as transistors. The hybrid switch assembly 6 is configured such that, when current is commutated from the mechanical contacts 14 to the electronic interrupter 15 (i.e. due to the detection of a fault by the trip unit 10), the mechanical contacts 14 are able to be opened rapidly with a reduced risk of arcing such that current cannot reflow through the mechanical contacts 14 after current is interrupted by the electronic interrupter 15. In addition to the trip unit 10, the control module 12 is also in electrical communication with the electronic interrupter 15 and an isolation switch 18. When current is commutated to the electronic interrupter 15, the control module 12 is configured to execute a tripping sequence that only allows the electronic interrupter 15 to remain powered on for a short interval of time and deactivates the electronic interrupter 15 after the prescribed interval of time, such that the line connection between the power source 3 and the load 4 is broken shortly after the current is commutated. Limiting the interval of time during which current can flow through the electronic interrupter 15 is important, as the electronic components of electronic interrupter 15 are not intended to withstand sustained continuous current flow. By enabling current to commutate past the mechanical contacts 14 and flow through the electronic interrupter 15 for only a limited time before the connection between the power source 3 and load 4 is completely opened, the effects of arcing are reduced. In addition to being configured to turn off the electronic interrupter 15 after current has been commutated, control module 12 is also configured to activate isolation switch 18 to open under certain predetermined conditions, in the event that the bus and/or downstream load 4 needs to be completely isolated from power. In an exemplary embodiment of the disclosed concept, isolation switch 18 comprises an electromagnetic actuator as detailed further later herein with respect to FIG. 3.

The mechanical branch of the circuit interrupter 1 (i.e. the current path followed when the mechanical contacts 14 are closed) is intended to carry continuous current with low resistance and losses, while the electronics branch (i.e. the current path followed when the electronic interrupter 15 is powered on) is intended to carry current for only the short interval of time it takes to commutate and interrupt the flow of current after detection of a fault in the circuit interrupter 1. It will be appreciated that proper interruption of current flow to the load 4 after a fault is detected in the circuit interrupter 1 depends upon the control module 12 functioning properly and turning off the electronic interrupter 15 shortly after the current is commutated. However, control modules such as control module 12 are often connected to their own upstream circuit breaker, meaning that, if there is a control power fault (for example and without limitation, an overload) that causes the control power circuit breaker to trip, the control module 12 will not receive power until the control power circuit breaker is reset.

In the event of a loss of control power resulting in the inability of the circuit interrupter 1 to be operated remotely or automatically, a mechanical means of isolating the circuit interrupter 1 from the downstream load 4 is necessary. Accordingly, the isolation switch 18 is structured to be manually opened, as detailed further herein with respect to FIGS. 3-7, so that the flow of current downstream can still be stopped in the event that control module 12 loses power and cannot power off the electronic interrupter 15 or in the event that isolation switch 18 cannot be electrically actuated to open.

Figure 2:
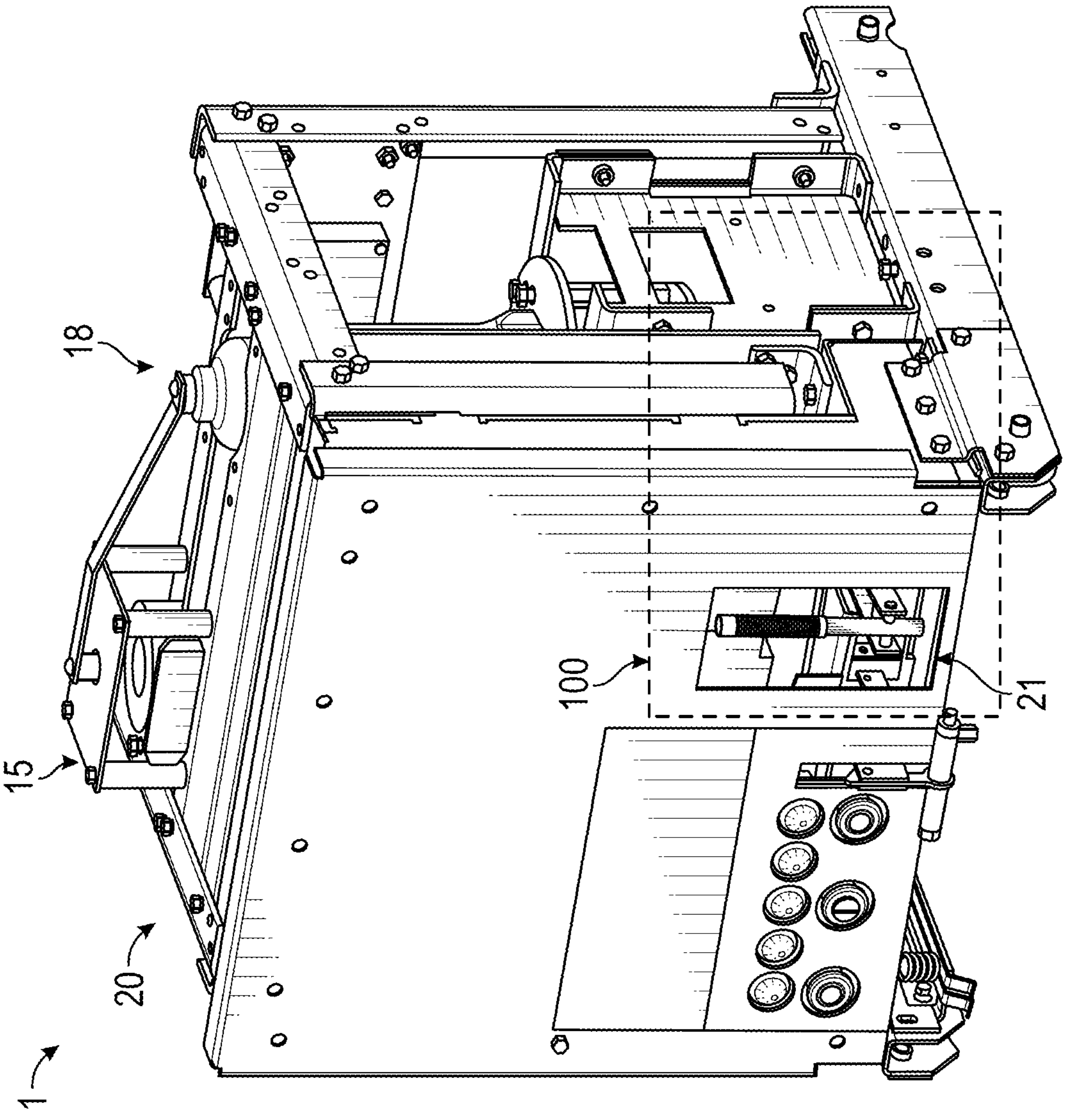
FIG. 2 is a partial isometric view of the circuit interrupter schematically depicted in FIG. 1, in accordance with an example embodiment of the disclosed concept.

FIG. 2 is a partial isometric view of the circuit interrupter 1 schematically depicted in FIG. 1, in accordance with an exemplary embodiment of the disclosed concept. In FIG. 2, a vacuum interrupter 15 (comprising the mechanical contacts 14 depicted in FIG. 1) and isolation switch 18 are shown disposed within an outer housing 20, and a wall of the outer housing 20 comprises an opening 21 through which the handle 102 of a manual opening mechanism 100 can be accessed. Manual opening mechanism 100 is fully integrated within circuit interrupter 1 and is structured to enable an operator to manually open isolation switch 18 by pulling the handle 102, as detailed further herein. In FIG. 2, a box numbered with reference number 100 is shown to denote where the manual opening mechanism 100 is integrated within circuit interrupter 1, since only the handle 102 of the manual opening mechanism 100 is visible (through the opening 21 in the outer housing 20) in FIG. 2. Manual opening mechanism 100 is shown in isolation in FIGS. 6 and 7 and the operation of manual opening mechanism 100 is detailed with respect to FIGS. 3-7. FIG. 2 depicts a medium voltage DC interrupter, although it will be appreciated that the features of the disclosed manual opening mechanism 100 disclosed herein can be adapter for other types of circuit interrupters without departing from the scope of the disclosed concept.

Figure 3:
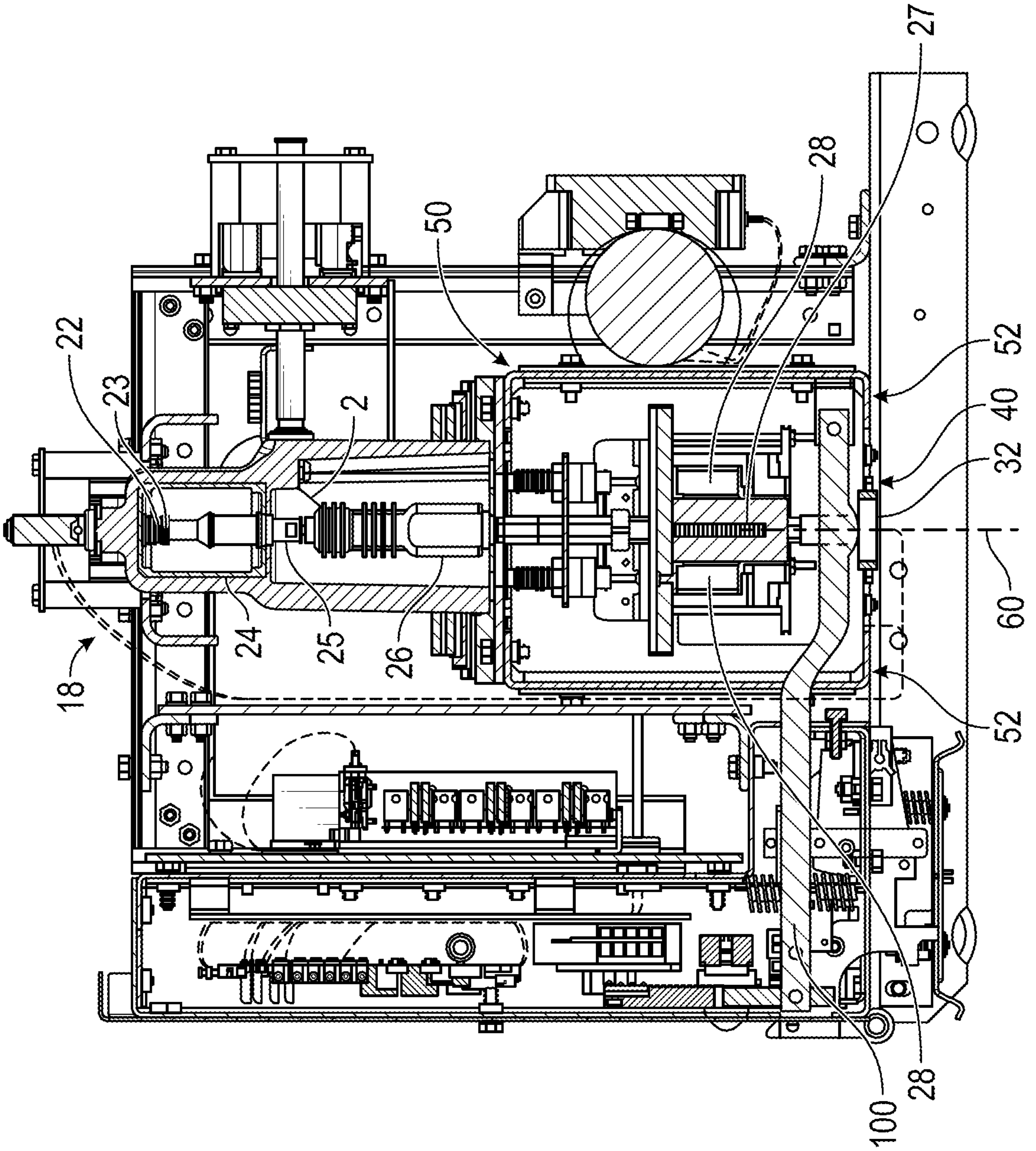
FIG. 3 is a sectional view along a first plane of the circuit breaker depicted in FIG. 2, showing a vacuum isolation switch operatively coupled to a fully integrated manual opening mechanism, in accordance with an example embodiment of the disclosed concept.

Referring now to FIG. 3, a sectional view of the hybrid circuit interrupter 1 of FIG. 2 is shown, in accordance with an example embodiment of the disclosed concept. In an exemplary embodiment as shown in FIG. 3, the isolation switch 18 is a vacuum isolation switch, wherein the isolation fixed contact 22 and isolation moving contact 23 are enclosed in a vacuum housing 24. It will be appreciated that hybrid circuit interrupter 1 and vacuum isolation switch 18 comprise a multitude of components, and that sectional views taken along some planes may obscure components that are only visible in sectional views taken along other planes. Accordingly, in order to show various components of the isolation switch 18 that are not visible in FIG. 3, FIG. 4 is provided to show an additional sectional view of isolation switch 18 taken along a different plane than that of FIG. 3.

Figure 4:
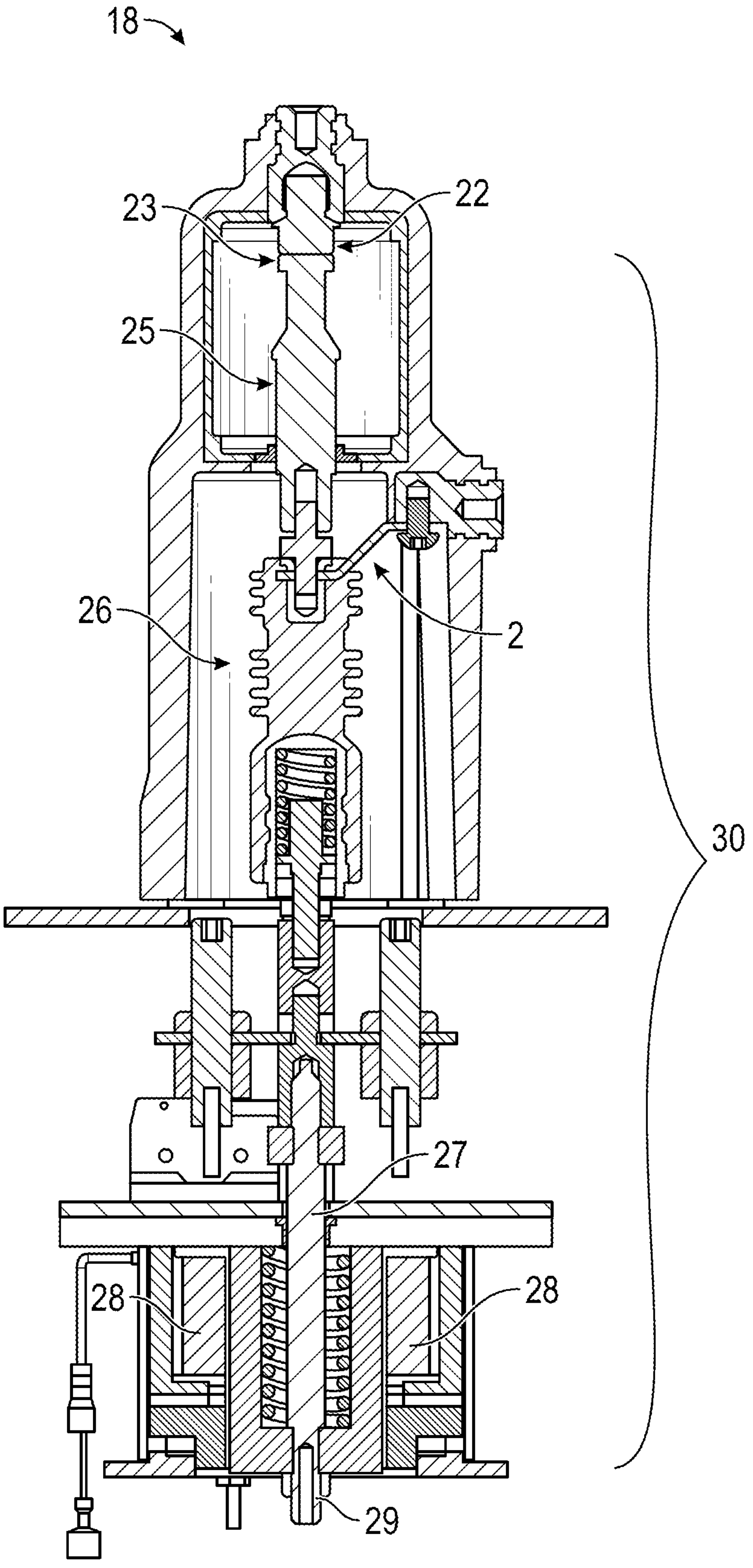
FIG. 4 is a sectional view of the vacuum isolation switch shown in FIG. 2 taken along a second plane, in accordance with an example embodiment of the disclosed concept.

Referring to FIG. 4 in conjunction with FIG. 3, the isolation moving contact 23 is coupled to a moving stem 25 which is coupled to a drive rod assembly 26 comprising a drive shaft 27. An isolation actuator 28 comprising a solenoid is in close proximity to drive shaft 27, and is configured to be actuated by control module 12 (i.e. by supplying current to solenoid 28) under conditions when the bus or downstream loads need to be isolated from power. It will be appreciated that the isolation switch 18 is shown in the closed state in FIGS. 3 and 4, and that activating solenoid 28 actuates the drive rod assembly 26 to move the moving stem 25 between a closed state and an open state. The closed state is that in which the isolation fixed contact 22 and the isolation moving contact 23 are in physical and electrical contact with one another, and the open state is that in which the isolation fixed contact 22 and the isolation moving contact 23 are physically separated and electrically isolated from one another. Specifically, with regard to the views shown in FIGS. 3 and 4, activating solenoid 28 when the isolation switch 18 is closed actuates the drive rod assembly 26 to move downward in order to open the switch 18. The components that move during opening of the isolation switch 18 can be collectively referred to as the moving assembly 30, as indicated in FIG. 4. The end of the moving assembly 30 comprising the isolation moving contact 23 can be referred to as the proximal end of the moving assembly, and the end of the moving assembly disposed opposite the proximal end can be referred to as the distal end of the moving assembly. Unless specifically noted otherwise, the term "proximal" as used herein refers to a direction leading toward the isolation moving contact 23 and the term "distal" as used herein refers to a direction opposite that of the proximal direction.

Figure 6:
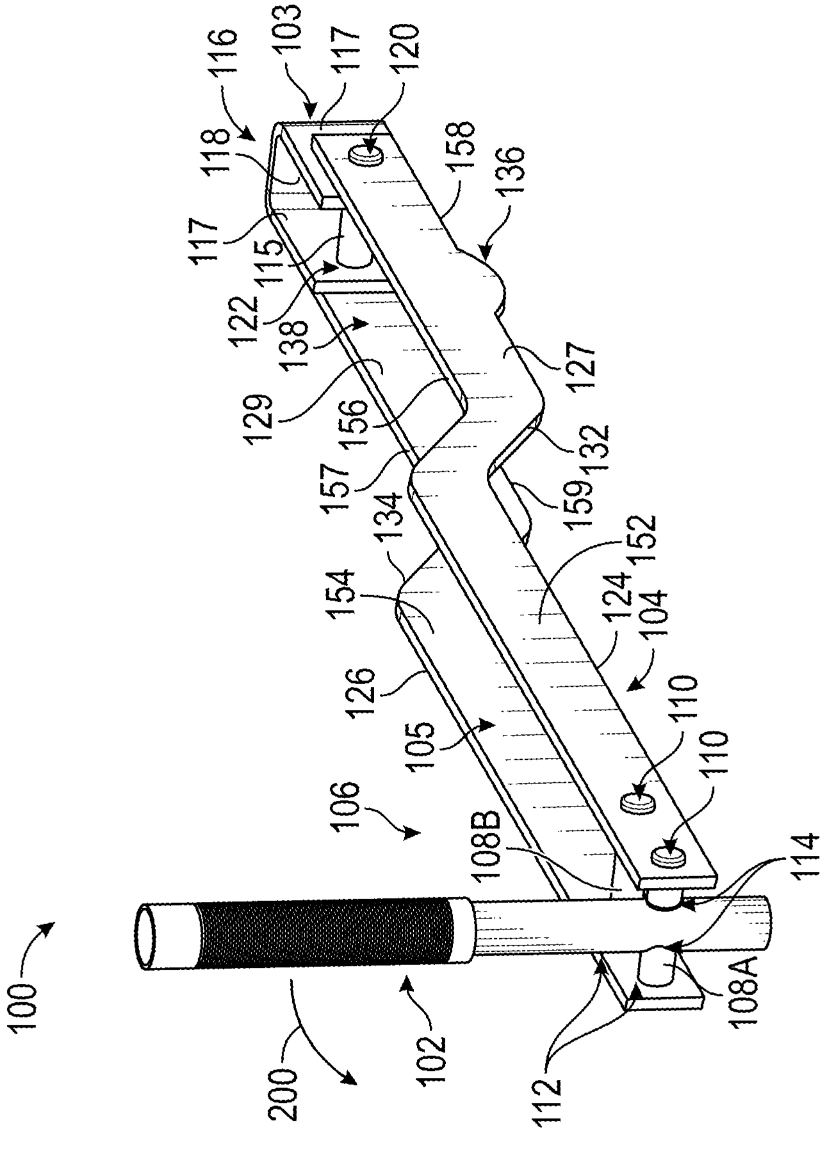
FIG. 6 is a partial isometric detail view of a manual opening mechanism shown in FIG. 3, in accordance with an example embodiment of the disclosed concept.
Figure 5:
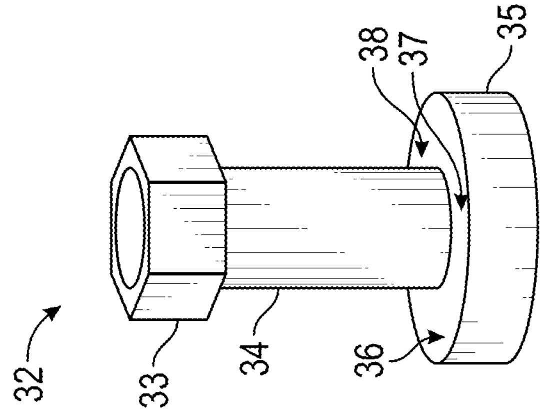
FIG. 5 is a partial isometric detail view of a drive shaft coupling shown in FIG. 3, in accordance with an example embodiment of the disclosed concept.

The drive shaft 27 comprises a distal end 29 (the distal end 29 being numbered in FIG. 4). A drive shaft coupling 32 (shown in FIG. 3 and FIG. 5) is coupled to the drive shaft 27 at distal end 29. The manual opening mechanism 100 is structured to operatively engage the drive rod assembly 26 via the drive shaft coupling 32 when handle 102 is pulled as indicated by arrow 200 in FIG. 6 and FIG. 7, in order to manually open the isolation switch 18 by separating the isolation moving contact 23 from the isolation fixed contact 22. A detail view of the drive shaft coupling 32 is shown in FIG. 5, and a detail view of the manual opening mechanism 100 is shown in FIG. 6. The drive shaft coupling 32 and manual opening mechanism 100 can be collectively referred to as the manual opening assembly 40, as indicated in FIG. 3. An actuator housing 50 is provided to house several components of the drive rod assembly 26 (such as the drive shaft 27) and the solenoid 28, and also includes an opening which enables the drive shaft coupling 32 to move freely between the interior and the exterior of the actuator housing 50 when the drive rod assembly 26 is actuated, whether by the solenoid 28 or by the manual opening mechanism 100. Specifically, FIG. 3 shows that the drive shaft coupling 32 is disposed partially within the interior of the actuator housing 50 and disposed partially externally to a floor 52 of the actuator housing 50 when the moving stem 25 is in the closed state, and it will be appreciated that a greater proportion of the drive shaft coupling 32 is disposed externally to the actuator housing 50 when the moving stem 25 is disposed in the open state.

As shown in FIG. 5, the drive shaft coupling 32 comprises three main portions: a nut 33, a coupling shaft 34, and a coupling base 35. The coupling shaft 34 couples the nut 33 to the coupling base 35. The nut 33 is structured to engage the distal end 29 of drive shaft 27 in order to couple the drive shaft coupling 32 to the drive shaft 27. Manual opening mechanism 100 is shown in FIG. 6 and comprises a handle 102 coupled to a body 103. Body 103 comprises all of the components of manual opening mechanism 100 aside from handle 102. Handle 102 is coupled to and disposed in between two arms 104 and 106, between which there exists a space 105. Viewing FIGS. 3, 5, and 6 in conjunction with one another, it can be seen that when the isolation switch 18 and manual opening mechanism 100 are assembled, shaft 34 of the drive shaft coupling 32 is structured to be disposed in the space 105 between arms 104 and 106 of manual opening mechanism 100 such that nut 33 is disposed above arms 104 and 106 and coupling base 35 is disposed below arms 104 and 106 ("above" and "below" being relative to the view shown in FIGS. 3, 5, and 6).

Still referring to FIG. 6, at a first end of the body 103, arms 104 and 106 are coupled to the handle 102 and to one another by a number of rotating pins 108 inserted into openings 110, 112, 114 formed in the arms 104, 106 and the handle 102. One of the rotating pins 108 in particular, pin 108A, is inserted into the openings 114 formed in handle 102 and is fastened in a manner that enables handle 102 to rotate when pulled by an operator, as indicated by arrow 200. Rotating pin 108B couples arm 104 and arm 106 to one another in a manner which enables pin 108B to rotate within holes 110 and 112. At a second end of the body 103 disposed opposite the first end, the arms 104, 106 are further coupled to one another by a pivoting pin 115 disposed through holes in the legs 117 of a u-bracket 116 and through openings 120, 122 formed in the arms 104, 106. Referring briefly again to FIG. 3, it should be noted that, in addition to coupling the arms 104, 106 to one another, the base 118 of u-bracket 116 is used to couple the manual opening mechanism 100 to the actuator housing 50. Any fastener suitable for fixedly coupling the base 118 of u-bracket 116 to the actuator housing 50 can be used, including, for example and without limitation, nuts and bolts. Both arms 104, 106 comprise a respective handle-adjacent portion 124, 126 and actuating portion 127, 129, with each of the actuating portions 127, 129 being coupled to its corresponding handle-adjacent portion 124, 126 by a sloped portion 132, 134.

Still referring to FIG. 6, each actuating portion 127, 129 comprises a protrusion 136, 138. It will be appreciated that protrusion 138 is not visible in FIG. 6 but is disposed on actuating portion 129 in a position corresponding to the positioning of protrusion 136 on actuating portion 127. Referring to FIGS. 3 and 5 in addition to FIG. 6, it should be noted that drive shaft coupling 32 and manual opening mechanism 100 are structured such that, when the manual opening assembly 40 is installed in the hybrid circuit interrupter 1, protrusions 136 and 138 of manual opening mechanism 100 are disposed adjacent to an impact surface 36 of coupling base 35 of drive shaft coupling 32, the impact surface 36 being identified as that surface of coupling base 35 which faces protrusions 136 and 138. Specifically, protrusion 136 is disposed adjacent to region 37 of impact surface 36 and protrusion 138 is disposed adjacent to region 38 of impact surface 36 such that coupling shaft 34 is disposed in between protrusions 136 and 138. It should be noted that the impact surface 36 is identified as the surface that faces protrusions 136 and 138. Alternatively, when the manual opening assembly 40 is installed in the hybrid circuit interrupter 1, the disposition of drive shaft coupling 32 and manual opening mechanism 100 relative to one another can also be described as the body 103 (specifically, the arms 104 and 106) of manual opening mechanism 100 being interposed between a first end of drive shaft coupling 32 (i.e. the end comprising nut 33 and facing toward the isolation separable contacts 22, 23) and a second end of drive shaft coupling 32 (i.e. the end comprising coupling 35) disposed opposite the first end.

Pivoting pin 115 facilitates arms 104, 106 being able to pivot relative to u-bracket 116, and rotating pin 108A facilitates handle 102 being able to rotate relative to arms 104, 106 when an operator rotates handle 102 as indicated by arrow 200 to open the isolation switch 18. The pivoting of arms 104, 106 relative to u-bracket 116 and the rotating of handle 102 relative to arms 104, 106 ensure that, when an operator rotates handle 102 to open the isolation switch 18, force is generated that results in protrusions 136 and 138 applying force orthogonally to impact surface 36 of drive assembly coupling 32 in order to move the drive assembly 26 and the moving stem 25 away from the isolation fixed contact 22.

Figure 7:
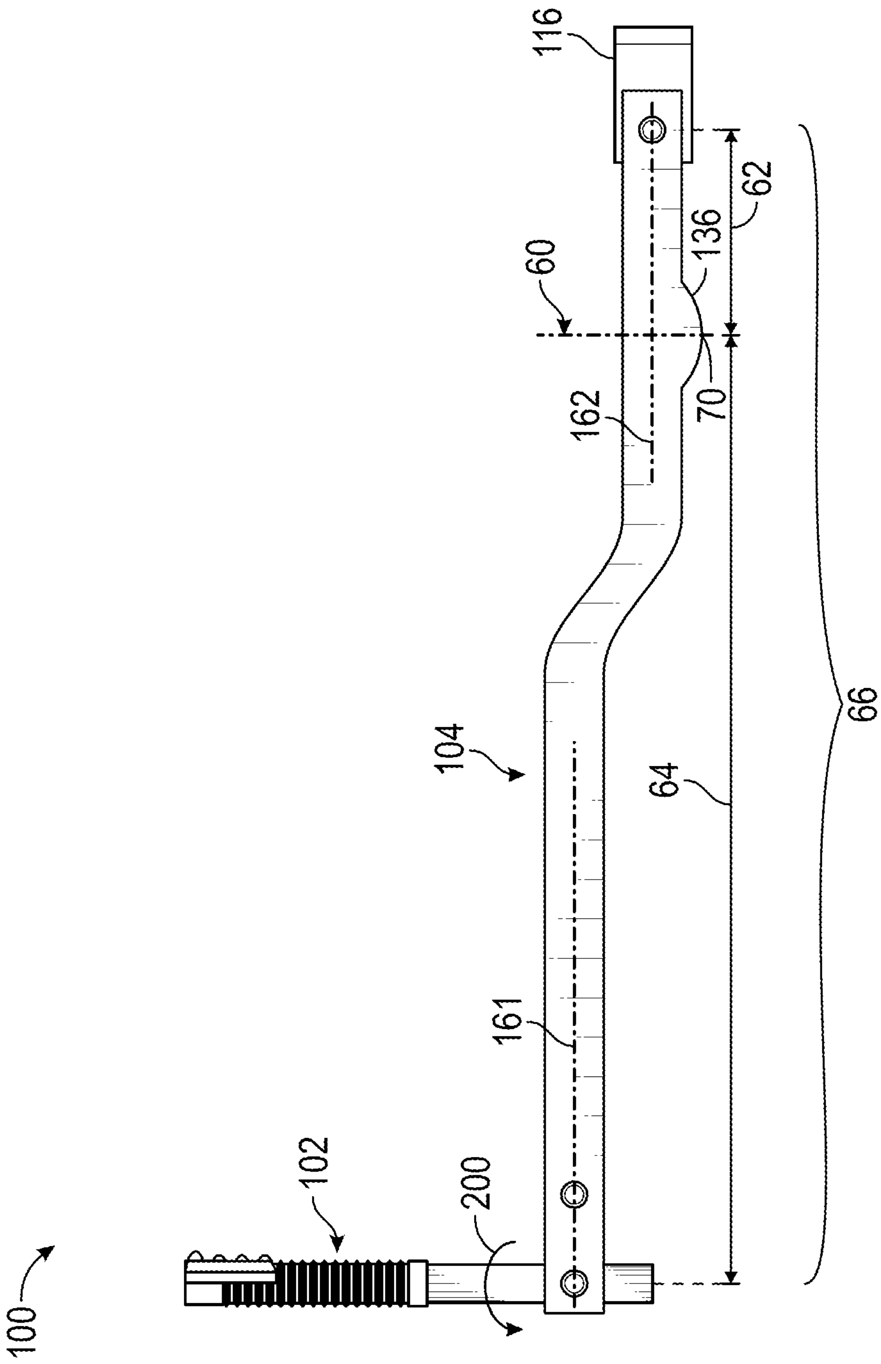
FIG. 7 is a side view of the manual opening mechanism shown in FIG. 6.

Referring now to FIG. 7, the mechanical attributes of manual opening mechanism 100 are presented. While only arm 104 is visible in FIG. 7, the mechanical attributes are discussed herein with reference to both arms 104 and 106, as arms 104 and 106 are functionally identical. Manual opening mechanism 100 is designed to provide excellent mechanical advantage. Protrusions 136 and 138 are positioned so that the force generated when an operator pulls handle 102 to open the isolation switch 18 is applied to the drive shaft centerline 60 (labeled in FIG. 7 and FIG. 3) as a result of the protrusions 136 and 138 applying force perpendicularly to impact surface 36 of drive shaft coupling base 35. It should be noted that the drive shaft centerline 60 is co-planar with a midpoint of each protrusion 136, 138, such that there is a plane perpendicular to the viewing plane of FIG. 7 that contains the centerline and the midpoints of both protrusions 136, 138. Midpoint 70 of protrusion 136 on arm 104 is labeled in FIG. 7. Applying force to the centerline 60 prevents uneven loading of the moving assembly and thus optimizes robustness during the manual opening operation.

Each arm 104, 106 comprises a planar interior surface and a planar exterior surface. The interior surface of each arm 104, 106 is the surface that faces space 105 such that the interior surface of each arm 104, 106 faces the interior surface of the other arm 106, 104. The exterior surface of each arm 104, 106 is the surface disposed opposite the interior surface, and the exterior and interior surfaces are equal in surface area. In FIG. 6, the exterior surface 152 of arm 104 and the interior surface 154 of arm 106 are visible, while the interior surface of arm 104 and the exterior surface of arm 106 are not visible. In FIG. 6, it can be seen that the exterior and interior surfaces of the two arms 104, 106 are bounded respectively at least by proximal edges 156, 157 and distal edges 158, 159. The proximal edges 156, 157 face a direction leading toward the isolation contacts 22, 23, and the distal edges 158, 159 are disposed opposite the proximal edges 156, 157.

Referring again to FIG. 7, the portions of proximal edges 156, 157 that bound handle-adjacent portions 124, 126 and the portions of proximal edges 156, 157 that bound actuator portions 127, 129 are straight such that, for each arm 104 or 106, a first plurality of lines coincident with the exterior surface of handle-adjacent portions 124, 126 are parallel to the proximal edge of the handle-adjacent portion 124 or 126, and a second plurality of lines coincident with the exterior surface of the actuating portions 127, 129 are parallel to the proximal edge of actuating portion 127 or 129. In FIG. 7, a line 161 is representative of the first plurality of parallel lines, and a line 162 is representative of the second plurality of parallel lines. For the sake of brevity, the first plurality of parallel lines for each arm 104 or 106 are referred to hereinafter as the lines coincident with the handle-adjacent portion 124 or 126, and the second plurality of parallel lines for each arm 104 or 106 are referred to hereinafter as the lines coincident with the actuating portion 127 or 129. The arms 104 and 106 are structured such that, within each arm 104 or 106, none of the aforementioned lines coincident with the handle-adjacent portion 124 or 126 can be co-linear with any of the aforementioned lines coincident with the corresponding actuating portion 127 or 129, due to the dimensions of sloped portions 132 and 134.

Still referring to FIG. 7, the midpoints of protrusions 136 and 138 (being coincident with the drive shaft centerline 60) are disposed a distance 62 from the pivoting pin 115, handle 102 is disposed a distance 64 from the midpoints of protrusions 136 and 138, and handle 102 is disposed a distance 66 from pivoting pin 115 such that distance 66 is equal to the sum of distances 62 and 64. The arms 104 and 106 are proportioned such that the ratios of distances 62 and 64 to distance 66 require the operator of the handle 102 to only input less than 10 pounds of force (10 lbf) to rotate the handle 102 sufficiently to open isolation switch 18 and stop the flow of current. In addition to the relatively low exertion required of an operator to open the isolation switch 18, the handle 102 is ergonomic, making the operation of manual opening mechanism 100 as easy as possible. In addition, while not pictured or detailed herein, the manual opening mechanism 100 is designed to be interlocked with a switchgear cell door such that an operator cannot open the switchgear cell door and operate the manual opening mechanism 100 while primary power is still flowing through the mechanical branch of the circuit interrupter 1.

Lastly, manual opening mechanism 100 and drive assembly coupling 32 are designed to prevent interference with normal operation of the isolation switch 18, normal operation being that which occurs when control module 12 is receiving upstream power and is able to provide current to solenoid 28 to activate drive rod assembly 26 to move moving stem 25 away from isolation fixed contact 22. Specifically, the manual opening assembly 40 is structured such that, during normal operation, the drive rod assembly 26 can move the moving stem 25 freely between the closed state (shown in FIG. 3) and the open state without resulting in any impact between protrusions 136, 138 and drive rod coupling 32, since the drive rod coupling 32 is proportioned such that its impact surface 36 cannot move any closer toward protrusions 136, 138 of manual opening mechanism 100 than to be adjacent to protrusions 136, 138 (as shown in FIG. 3).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An isolation switch for use with a hybrid circuit interrupter, the isolation switch comprising:

a fixed separable contact;

a moving assembly, the moving assembly comprising:

a moving stem comprising a moving separable contact; and a drive rod assembly coupled to the moving stem, the drive rod assembly comprising a drive shaft; and a manual opening assembly, the manual opening assembly comprising:

a drive shaft coupling coupled to a distal end of the drive shaft, the drive shaft coupling comprising a first end and a second end disposed opposite the first end, the first end facing toward the moving separable contact; and a manual opening mechanism, the manual opening mechanism comprising:

a body comprising two arms coupled to one another; and a handle operatively coupled to the body, wherein the moving assembly is structured to move the moving separable contacts between a closed state and an open state, wherein the body of the manual opening mechanism is interposed between the first end and the second end of the drive shaft coupling, wherein the manual opening mechanism is structured to actuate the moving assembly to move from the closed state to the open state when the handle is rotated, wherein each of the two arms comprises both a proximal edge and a distal edge, the proximal edg e towa d se rable contact and the moving separable contact, and the distal edge being disposed opposite the proximal edge, wherein the distal edge of each of the two arms is disposed opp te the proximal edge and comprises protrusion, wherein the drive shaft coupling comprises a base with an impact surface disposed to face and be adjacent to the protrusion of each of two arms, and wherein the manual opening assembly is structured such that, when the handle is rotated, force is applied by the protrusion of each of the two arms to a centerline of the drive shaft via the impact surface drive shaft coupling base.

2. The isolation switch of claim 1, further comprising:

an actuator housing that houses a portion of the moving assembly, wherein a first end of the body of the manual opening mechanism is coupled to the handle, and wherein a second end of the body of the manual opening mechanism disposed opposite the first end of the body is coupled to the actuator housing.

3. The isolation switch of claim 2, wherein the second end of the body comprises a u-bracket and a pivoting pin, wherein the pivoting pin couples a first of the two arms to a first leg of the u-bracket and couples a second of the two arms to a second leg of the u-bracket such that the two arms are able to pivot relative to the u-bracket, and wherein a base of the u-bracket is fixedly coupled to the actuator housing.

4. The isolation switch of claim 3, wherein the first end of the body comprises a number of rotating pins that couple the two arms to one another, and wherein at least one of the number of rotating pins couples the two arms to the handle such that the handle is able to rotate relative to the two arms.

5. The isolation switch of claim 2, wherein the first end of the body comprises a number of rotating pins that couple the two arms to one another, and wherein at least one of the number of rotating pins couples the two arms to the handle such that the handle is able to rotate relative to the two arms.

6. The isolation switch of claim 1, wherein each of the two arms comprises a handle-adjacent portion coupled to the handle, wherein each of the two arms comprises an actuating portion coupled to an actuator housing, wherein each of the two arms comprises a sloped edge coupling the handle-adjacent portion to the actuating portion, wherein, for each of the two arms, the handle-adjacent portion and the actuating portion are structured such that no lines coincident with an exterior surface of the handle-adjacent portion and parallel to the proximal edge can be co-linear with any lines coincident with an exterior surface of the actuating portion and parallel to the proximal edge.

7. The isolation switch of claim 1, wherein the manual opening mechanism is structured to require less than 10 pounds force to rotate the handle in order to actuate the moving assembly to move from the closed state to the open state.

8. The isolation switch of claim 1, wherein the isolation switch is a vacuum switch.

9. A hybrid circuit interrupter, the circuit interrupter comprising:

a line conductor structured to connect a load to a power source;

a hybrid switch assembly disposed between the power source and the load, the hybrid switch assembly comprising:

mechanical separable contacts structured to move between a closed state and an open state; and an electronic interrupter comprising a number of electronic components, the electronic interrupter being structured to commutate current when a fault is detected on the line conductor;

an operating mechanism structured to open and close the separable contacts;

an electronic trip unit structured to monitor the line conductor for fault conditions and actuate the operating mechanism; and a vacuum isolation switch disposed between the hybrid switch assembly and the load, the vacuum isolation switch comprising:

an isolation fixed separable contact;

a moving assembly, the moving assembly comprising:

a moving stem comprising an isolation moving separable contact; and a drive rod assembly coupled to the moving stem, the drive rod assembly comprising a drive shaft; and a manual opening assembly, the manual opening assembly comprising:

a drive shaft coupling coupled to a distal end of the drive shaft, the drive shaft coupling comprising a first end and a second end disposed opposite the first end, the first end facing toward the isolation moving separable contact; and a manual opening mechanism, the manual opening mechanism comprising:

a body comprising two arms coupled to one another; and a handle operatively coupled to the body; and wherein the isolation switch moving assembly is structured to move the isolation moving separable contact between a closed state and an open state, wherein the body of the manual opening mechanism is interposed between the first end and the second end of the drive shaft coupling, wherein the manual opening mechanism is structured to actuate the isolation switch moving assembly to move from the closed state to the open state when the handle is rotated, wherein the isolation switch is disposed along the line conductor such that opening the isolation switch disconnects the load from the power source, wherein each of the two arms of the manual opening assembly comprises both a proximal edge and a distal edge, the proximal edge facing toward the isolation moving separable contact, and the distal edge being disposed opposite proximal edge, wherein the distal edge of each of the two arms is disposed the proximal edge and comprises a protrusion, wherein the drive shaft coupling comprises a base with an impact surface disposed to face and be adjacent to the protrusion of each of the two arms, and wherein the manual opening assembly is structured such that, when the handle is rotated, force is applied by the protrusion of each of the two arms to a centerline of the drive shaft via the impact surface of the drive shaft coupling base.

10. The hybrid circuit interrupter of claim 9, further comprising:

a control module in electrical communication with the electronic trip unit, the hybrid switch assembly, and the vacuum isolation switch, a solenoid disposed in proximity to the drive shaft and in electrical communication with the control module, wherein the control module is configured to power off the electronic interrupter after commutation of current to the electronic interrupter and to supply current to the solenoid to actuate the isolation switch moving assembly in order to open the vacuum isolation switch under a number of predetermined conditions, and wherein the manual opening assembly is structured to not interfere with movement of the isolation switch moving assembly when the drive shaft assembly is actuated to move by the solenoid.

11. The hybrid circuit interrupter of claim 9, wherein the manual opening assembly is configured such that the handle cannot be moved if the mechanical separable contacts are closed such that power is flowing from the power source to the load.

12. The hybrid circuit interrupter of claim 9, wherein the vacuum isolation switch further comprises an actuator housing that houses a portion of the moving assembly, wherein a first end of the body of the manual opening mechanism is coupled to the handle, and wherein a second end of the body of the manual opening mechanism disposed opposite the first end of the body is coupled to the actuator housing, wherein the second end of the body comprises a u-bracket and a pivoting pin, wherein the pivoting pin couples a first of the two arms to a first leg of the u-bracket and couples a second of the two arms to a second leg of the u-bracket such that the two arms are able to pivot relative to the u-bracket, and wherein a base of the u-bracket is fixedly coupled to the actuator housing.

13. The hybrid circuit interrupter of claim 12, wherein the first end of the body of the manual opening mechanism comprises a number of rotating pins that couple the two arms to one another, and wherein at least one of the number of rotating pins couples the two arms to the handle such that the handle is able to rotate relative to the two arms.

14. The hybrid circuit interrupter of claim 9, wherein each of the two arms comprises a handle-adjacent portion coupled to the handle, wherein each of the two arms comprises an actuating portion coupled to an actuator housing, wherein each of the two arms comprises a sloped edge coupling the handle-adjacent portion to the actuating portion, wherein, for each of the two arms, the handle-adjacent portion and the actuating portion are structured such that no lines coincident with an exterior surface of the handle-adjacent portion and parallel to the proximal edge can be co-linear with any lines coincident with an exterior surface of the actuating portion and parallel to the proximal edge.

15. The hybrid circuit interrupter of claim 9, wherein the circuit interrupter is a medium voltage DC circuit interrupter, and wherein the manual opening mechanism is structured to require less than 10 pounds force to rotate the handle in order to actuate the moving assembly to move from the closed state to the open state.

16. An isolation switch for use with a hybrid circuit interrupter, the isolation switch comprising:

a fixed separable contact;

a moving assembly, the moving assembly comprising:

a moving stem comprising a moving separable contact; and a drive rod assembly coupled to the moving stem, the drive rod assembly comprising a drive shaft;

a solenoid disposed in proximity to the drive shaft and in electrical communication with a control module, and a manual opening assembly, the manual opening assembly comprising:

a drive shaft coupling coupled to a distal end of the drive shaft, the drive shaft coupling comprising a first end and a second end disposed opposite the first end, the first end facing toward the moving separable contact; and a manual opening mechanism, the manual opening mechanism comprising:

a body comprising two arms coupled to one another; and a handle operatively coupled to the body, wherein the solenoid is configured to receive power from the control module and to actuate the moving assembly in order to open a vacuum isolation switch under a number of predetermined conditions, wherein the manual opening assembly is structured to not interfere with movement of the isolation switch moving assembly when the drive shaft assembly is actuated to move by the solenoid, wherein the moving assembly is structured to move the moving separable contacts between a closed state and an open state, wherein the manual opening mechanism is structured to actuate the moving assembly to move from the closed state to the open state when the handle is rotated, wherein the body of the manual opening mechanism is interposed between the first end and the second end of the drive shaft coupling, wherein each of the two arms comprises both a proximal edge and a distal edge, the proximal edge facing toward the moving separable contact, and the distal edge being disposed opposite the proximal edge, wherein the distal edge of each of the two arms is disposed opposite the proximal edge and comprises a protrusion, wherein the drive shaft coupling comprises a base with an impact surface disposed to face and be adjacent to the protrusion of each of the two arms, wherein the manual opening assembly is structured such that, when the handle is rotated, force is applied by the protrusion of each of the two arms to a centerline of the drive shaft via the impact surface of the drive shaft coupling base.

17. The isolation switch of claim 16, wherein the manual opening mechanism is structured to require less than 10 pounds force to rotate the handle in order to actuate the moving assembly to move from the closed state to the open state.

* * * * *